H. O. Perry,
Oscillating Steam Engine.
No. 2,646. Reissued June 11, 1867.
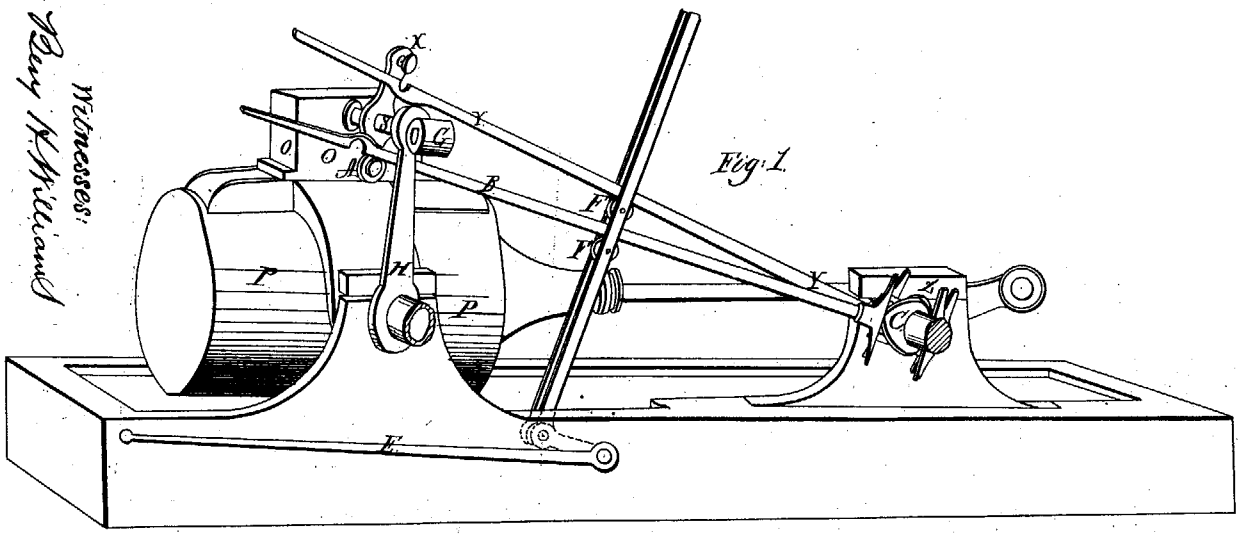
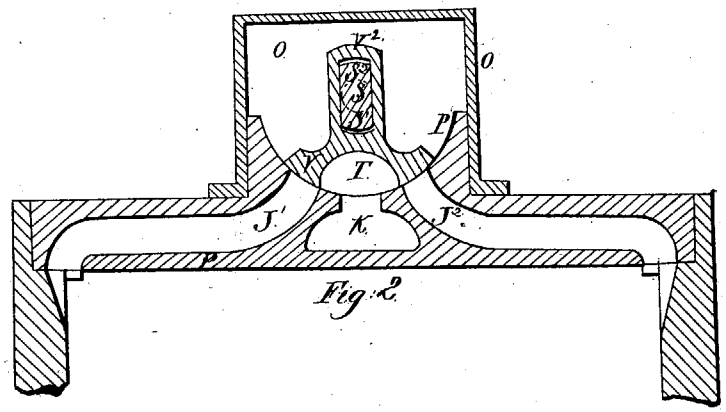
Witnesses:
Benj H. Williams
E. H. Read
Inventor:
Horatio O. Perry.
N. PETERS, PHOTO-LITHOGRAPHER, WASHINGTON, D. C.

United States Patent Office.

JOHN D. SHEPARD, OF BUFFALO, NEW YORK, ASSIGNEE OF HORATIO O. PERRY.

*Letters Patent No.* 14,516, *dated March* 25, 1856; *reissue No.* 2,646, *dated June* 11, 1867.

DIVISION B.

IMPROVEMENT IN VALVES FOR STEAM ENGINES.

The Schedule referred to in these Letters Patent and making part of the same.

TO ALL WHOM IT MAY CONCERN:

Be it known that I, HORATIO O. PERRY, of the city of Buffalo, in the county of Erie, and State of New York, have invented a new and improved Valve for Steam Engines; and I do hereby declare that the following is a full and exact description thereof, reference being had to the accompanying drawings and to the letters of reference marked thereon.

My invention relates to the form of the valve and valve-seat and to the mode of mounting and operating the valve, so that it shall press fairly and wear evenly on the face against which it works. My valve has a cylindrical surface and shallow throat, and its cylindrical surface is made to fit in steam-tight contact with a correspondingly hollowed face on the cylinder, and it is adapted to operate by partial revolutions of a shaft which passes through it. The said shaft is mounted firmly in proper bearings in the steam-chest and extends out through a stuffing-box at one end so as to be actuated by the mechanism of the engine, and thus partially revolved alternately in opposite directions. The valve is mounted loosely thereon, so that it is free to rise out of contact with the hollow face against which it works, yet so that it is compelled to turn with the shaft. The ports are so arranged on said hollow face of the cylinder that the effect of my valve, cylinder face, and operating shaft is substantially the same in the distribution or use of the steam as that of the ordinary hollow-throated flat slide-valve worked by an ordinary valve-stem and loose bridle, with the advantage that the mechanism required to operate it is more compact. My valve allows of being operated by mechanism which is of a construction which could not be employed with the common slide-valve, and the wear on the face of the valve and of the cylinder is more even.

I will proceed to describe what I consider the best means of carrying out my invention. The accompanying drawings form a part of this specification.

Figure 1 is a perspective view of an oscillating engine having my valve and suitable means of giving the proper motion thereto.

Figure 2 is a section through the valve and the adjacent parts on a larger scale.

The figures show the novel parts, with so much of the other parts as is necessary to indicate their relation thereto.

Similar letters of reference indicate like parts in both the figures.

P is the cylinder; O the steam-chest; S the valve-shaft; and V the valve. The valve-shaft S is made cylindrical in section at the points where it is supported in the steam-chest, as will be readily understood, but along that part of its length which extends through the valve it is flattened, as represented, and the two flat faces are accurately finished, by planing or otherwise, so as to be exactly plane and parallel. The valve V is constructed with a corresponding hole to receive the flattened portion of the valve-shaft S. The valve cannot turn except as the valve-shaft S turns, but the valve may rise and sink to a limited extent without compelling any corresponding motion of the valve-shaft. The lower edge of the flattened portion of the shaft S is marked $S^1$. The adjacent portion of the valve V is marked $V^1$. The opposite portions, that is to say, the upper edge of the flattened part of the shaft and the adjacent portions of the valve, are marked respectively $S^2$ and $V^2$. The thickness of the hole in the valve is but a very little greater than the thickness of the valve-shaft, so that the valve-shaft cannot turn to any appreciable extent without compelling a corresponding motion of the valve V. T is a hollow throat formed in the cylindrical surface of the valve V. P′ is the cylinder face, hollowed as represented, the surface being a portion of a cylinder, the axis of which cylinder coincides with the axis of the valve-shaft S. $J^1$ is a port leading to one end of the cylinder. $J^2$ is a port leading to the other end of the cylinder. K is an exhaust port, which communicates with the external atmosphere, or with the condenser if the engine is low pressure. My valve, cylinder face, and valve-shaft, with the ports arranged as represented, may be employed with various kinds of mechanism for imparting the proper oscillating motion, but I prefer the means represented. I make the arm X longer than the arm A, and as this increased length diminishes the effect of the eccentric I give the eccentric Z more throw than C. The proportionate dimensions of all these parts in any case may be determined by any competent person, as also the precise device most suitable for connecting and disconnecting the eccentric rods. In the drawing the eccentric rods are represented as hooking in opposite directions, and by elevating the lever E the pulleys or rollers F F are lifted, and both eccentric rods are raised until the upper one, Y, catches the pin X and gives a backward motion to the engine. On the contrary, by depressing E both rods are depressed until the rod B catches the arm A, and a forward motion is the result. To facilitate working by hand, I prolong the valve-shaft S, and provide its extremity with a socket, G, in which I insert a starting-bar at pleasure, and to steady and support the valve-shaft S I provide the arm H fixed on the trunnion of the cylinder. Partially rotating valves, which were mounted loosely on valve-shafts having flattened sections analogous to my parts $V^1$ $V^2$ $S^1$ $S^2$, have been known for many years, and have been introduced very extensively and successfully by the Corlis Steam-Engine Works and others, but no valve so mounted and operated had a hollow throat, T, or any equivalent therefor, or was adapted to operate with the effect of my invention. Those valves were simply adapted each to cover and uncover a single port. Cocks known as three-way cocks, and others, have had hollow throats analogous to my hollow throat T, but no such cocks have been mounted on a shaft like mine, so as to allow it to move from and toward its seat. A valve and valve-seat analogous to mine were proposed and sketched in the Mechanics' Magazine in London about the year 1846, but such were not equivalent to my invention, because the mode of operating was much inferior, and would have failed if tried. The shaft was not received in a corresponding hole in the valve. On the contrary, the valve did not reach up to the valve-shaft, so that its axis should be held coincident with the axis thereof, but there was simply an arm extending downward from the shaft to act on simple lugs or stops on the back of the valve. Such a mode of operating under a pressure of steam would tend to roll the valve forward, making the pressure greatest on its advancing edge, as it was impelled in either direction. My valve V, on the contrary, receives the motion from the flattened portion of the valve-shaft S, so as to turn the valve with a direct force, and without any difference between the pressure on the forward edge of the valve and that on the rear edge. The valve-shaft S, in turning in either direction, compels the valve to turn to a corresponding extent, while supporting and firmly holding its axis coincident with the axis of the shaft. It allows the valve to follow up and approach bodily to the cylinder as the rubbing surfaces wear away, as also to leave the cylinder face, when required, to discharge water, etc., without inducing any displacement of the valve-shaft S. It allows a very compact and convenient arrangement of the mechanism for operating it, and is preferable to the hollow-throated flat slide-valve for many forms of steam engines, and in many other situations where fluids are to be received and discharged from cylinders or other vessels. I have used it operated by a cam with great advantage on pumps as a means of controlling alternate induction and eduction of the water from the ends of the pump. The edges $S^1$ $S^2$ on the flattened portion of the valve-shaft S, acting against the corresponding parts $V^1$ $V^2$ on the valve, are in fact duplicate bearings. One pair above, as $V^1$ $S^1$, would be sufficient to impart the motion to the valve, but it is only by the duplication that my invention is able to impart the motion properly, and at the same time to perform in the other respects as specified.

Having now fully described my invention, what I claim as new, and desire to secure by these Letters Patent, is—

I claim holding the axis of the hollow-throated partially cylindrical valve V T coincident with the centre of the curve of the cylinder face by oscillating it by acting on the duplicate bearings $V^1$ $V^2$ $S^1$ $S^2$, so that it is at liberty to approach and recede from the cylinder face, substantially as and for the purpose herein specified.

HORATIO O. PERRY.

Witnesses:

BENJ. H. WILLIAMS,

E. H. READ.